(12) United States Patent
Nishisaka et al.

(10) Patent No.: US 10,504,651 B2
(45) Date of Patent: Dec. 10, 2019

(54) MULTILAYER CERAMIC CAPACITOR

(71) Applicant: Murata Manufacturing Co., Ltd., Nagaokakyo-shi, Kyoto-fu (JP)

(72) Inventors: Yasuhiro Nishisaka, Nagaokakyo (JP); Akito Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/723,222

(22) Filed: Oct. 3, 2017

(65) Prior Publication Data

US 2018/0096791 A1    Apr. 5, 2018

(30) Foreign Application Priority Data

Oct. 4, 2016    (JP) ................................. 2016-196102

(51) Int. Cl.
| | | |
|---|---|---|
| *H01G 4/232* | (2006.01) | |
| *H01G 4/30* | (2006.01) | |
| *H01G 4/012* | (2006.01) | |
| *H01G 4/33* | (2006.01) | |
| *H01G 4/12* | (2006.01) | |
| *H01G 4/248* | (2006.01) | |

(52) U.S. Cl.
CPC .......... *H01G 4/2325* (2013.01); *H01G 4/012* (2013.01); *H01G 4/33* (2013.01); *H01G 4/12* (2013.01); *H01G 4/248* (2013.01)

(58) Field of Classification Search
CPC ............ H01G 4/30; H01G 4/33; H01G 4/228; H01G 4/232
See application file for complete search history.

(56) References Cited

U.S. PATENT DOCUMENTS 5,712,758 A * 1/1998 Amano ................ H01G 4/2325
                                                    361/306.3
2007/0227649 A1    10/2007 Onodera et al.
2010/0195265 A1*  8/2010 Nakamura ............. C04B 35/03
                                                    361/321.4

(Continued)

FOREIGN PATENT DOCUMENTS

| JP | 2007-266208 A | 10/2007 |
| JP | 2008-159965 A | 7/2008 |
| JP | 2014116502 A * | 6/2014 |

(Continued)

OTHER PUBLICATIONS

Official Communication issued in corresponding Korean Patent Application No. 10-2017-0125943, dated Feb. 19, 2019.

*Primary Examiner* — Eric W Thomas
(74) *Attorney, Agent, or Firm* — Keating & Bennett, LLP (57) ABSTRACT

A multilayer ceramic capacitor includes a laminate in which dielectric layers and internal electrodes are alternately stacked, and a pair of external electrodes provided on the corresponding surfaces of the laminate. The laminate includes first and second principal surfaces facing each other in its thickness direction, first and second end surfaces facing each other in its lengthwise direction, and first and second side surfaces facing each other in its width direction. The external electrodes each include a metal layer covering the internal electrodes extended to the corresponding one of the end surfaces, a baked layer including glass and metal covering the metal layer, and a plated film covering the baked layer.

10 Claims, 6 Drawing Sheets

(56) References Cited

U.S. PATENT DOCUMENTS

| | | | |
|---|---|---|---|
| 2015/0016018 A1* | 1/2015 | Onishi | H01G 4/005 361/301.4 |
| 2016/0002111 A1* | 1/2016 | Yoon | C04B 35/468 361/301.4 |

FOREIGN PATENT DOCUMENTS

| | | | |
|---|---|---|---|
| JP | 2014116502 A | * | 6/2014 |
| KR | 10-2016-0079748 A | | 7/2016 |

* cited by examiner

MULTILAYER CERAMIC CAPACITOR

CROSS REFERENCE TO RELATED APPLICATIONS

This application claims the benefit of priority to Japanese Patent Application No. 2016-196102 filed on Oct. 4, 2016. The entire contents of this application are hereby incorporated herein by reference.

BACKGROUND OF THE INVENTION

1. Field of the Invention

The present invention relates to a multilayer ceramic capacitor and a method for manufacturing the same, and more particularly, to a multilayer ceramic capacitor including a laminate in which a plurality of dielectric layers and internal electrodes are alternately stacked, and an external electrode provided on a surface of the laminate, and a method for manufacturing the same.

2. Description of the Related Art

In recent years, multilayer ceramic capacitors with a small size and large capacitance have been widely used with a decrease in the size and weight of electronic apparatuses. As such multilayer ceramic capacitors, a known multilayer ceramic capacitor includes a laminate in which a plurality of dielectric layers and internal electrodes are alternately stacked, and a pair of external electrodes provided on the corresponding surfaces of the laminate to be electrically connected to the internal electrodes.

Japanese Patent Application Laid-Open No. 2007-266208 describes a method for forming an external electrode of a chip-like electronic component, such as a multilayer ceramic capacitor.

To achieve a reduction in size and an increase in capacitance in a multilayer ceramic capacitor including an external electrode, it is preferable that the external electrode is reduced in thickness. Unfortunately, when an external electrode is reduced in thickness, moisture seeps into a laminate through the external electrode to cause a problem in that insulation resistance is deteriorated to decrease moisture resistance reliability.

SUMMARY OF THE INVENTION

Preferred embodiments of the present invention provide multilayer ceramic capacitors that are capable of reducing entry of moisture into a laminate through an external electrode, that have high moisture resistance reliability, and a method for manufacturing the same.

A multilayer ceramic capacitor according to a preferred embodiment of the present invention includes a laminate in which a plurality of dielectric layers and internal electrodes are alternately stacked with each other, and a pair of external electrodes each of which is provided on a surface of the laminate to be electrically connected to the internal electrodes extended to the surface of the laminate, the laminate including a first principal surface and a second principal surface, facing each other in a thickness direction being a lamination direction of the dielectric layers and the internal electrodes; a first end surface and a second end surface, facing each other in a lengthwise direction being a direction in which the pair of external electrodes face each other, and being provided with the corresponding external electrodes; and a first side surface and a second side surface, facing each other in a width direction orthogonal or substantially orthogonal to the thickness direction and the lengthwise direction, and the external electrodes each including a metal layer disposed on the corresponding one of the first end surface and the second end surface so as to cover the corresponding internal electrodes extended to the first end surface and to the second end surface; a baked layer including glass and metal, being disposed so as to cover the metal layer; and a plated film disposed so as to cover the baked layer.

The metal layer may preferably include at least one metal selected from a group consisting of Cu, Ni, Ag, Pd, and Au.

In addition, a glass film may preferably be provided around the metal layer while being adjacent to the metal layer on each of the first end surface and the second end surface.

The glass film may preferably have a glass content higher than that of the baked layer positioned on the metal layer.

A method for manufacturing a multilayer ceramic capacitor according to a preferred embodiment of the present invention includes the steps of preparing a laminate including a plurality of dielectric layers and internal electrodes, being alternately stacked with each other; a first principal surface and a second principal surface, facing each other in a thickness direction being a lamination direction of the dielectric layers and the internal electrodes; a first end surface and a second end surface, facing each other in a lengthwise direction orthogonal or substantially orthogonal to the thickness direction; and a first side surface and a second side surface, facing each other in a width direction orthogonal or substantially orthogonal to the thickness direction and the lengthwise direction; forming a metal layer on the corresponding one of the first end surface and the second end surface so as to cover the corresponding internal electrodes extended to the first end surface and to the second end surface; applying a conductive paste including glass and metal so as to cover the metal layer; forming a baked layer by baking the conductive paste; and forming a plated film on the baked layer.

The conductive paste may preferably include about 5% or more glass by volume, for example.

According to various preferred embodiments of the present invention, the metal layer is disposed so as to cover the internal electrodes extended to the end surface of the laminate, and further, the baked layer including glass and metal is disposed so as to cover the metal layer, so that entry of moisture into the laminate through the end surface is reduced to enable moisture resistance reliability to be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below to more specifically describe features of the present invention with reference to the drawings.

Figure 1:
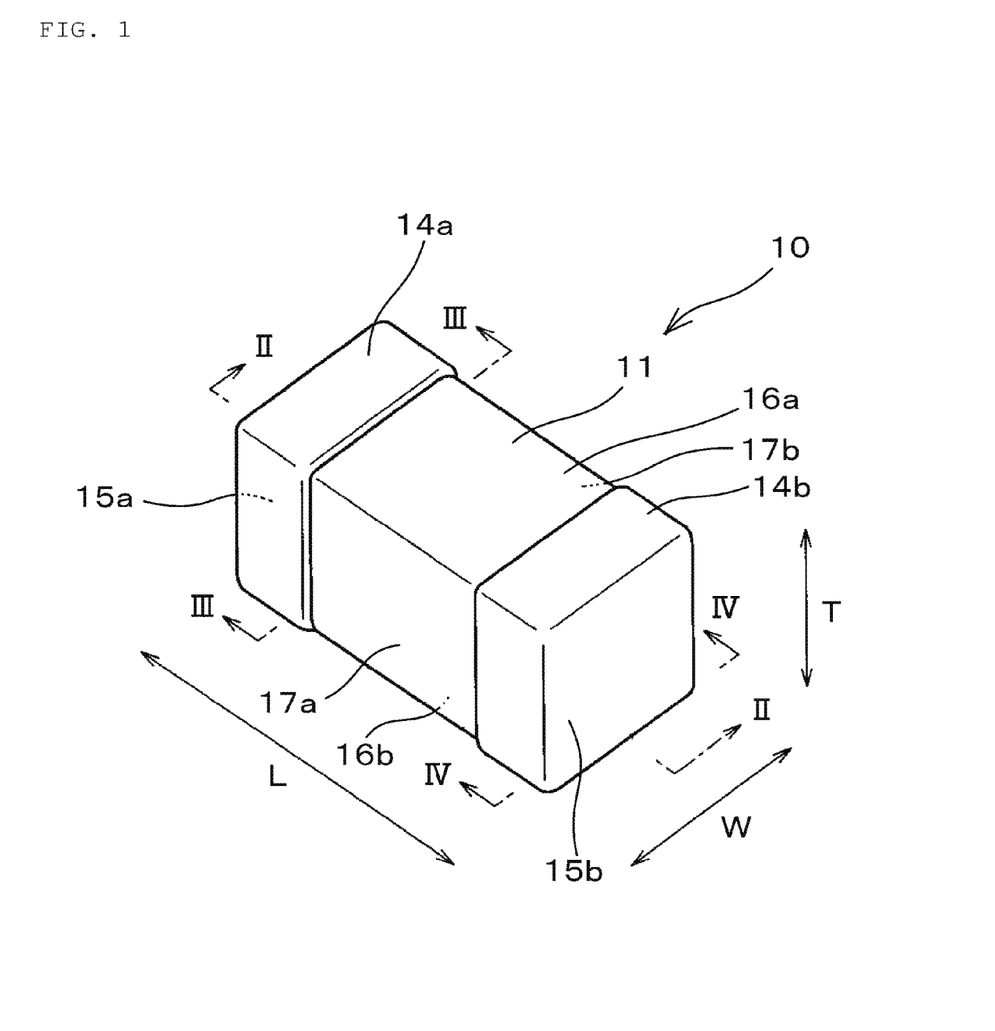
FIG. 1 is a perspective view of a multilayer ceramic capacitor in a preferred embodiment of the present invention.
Figure 2:
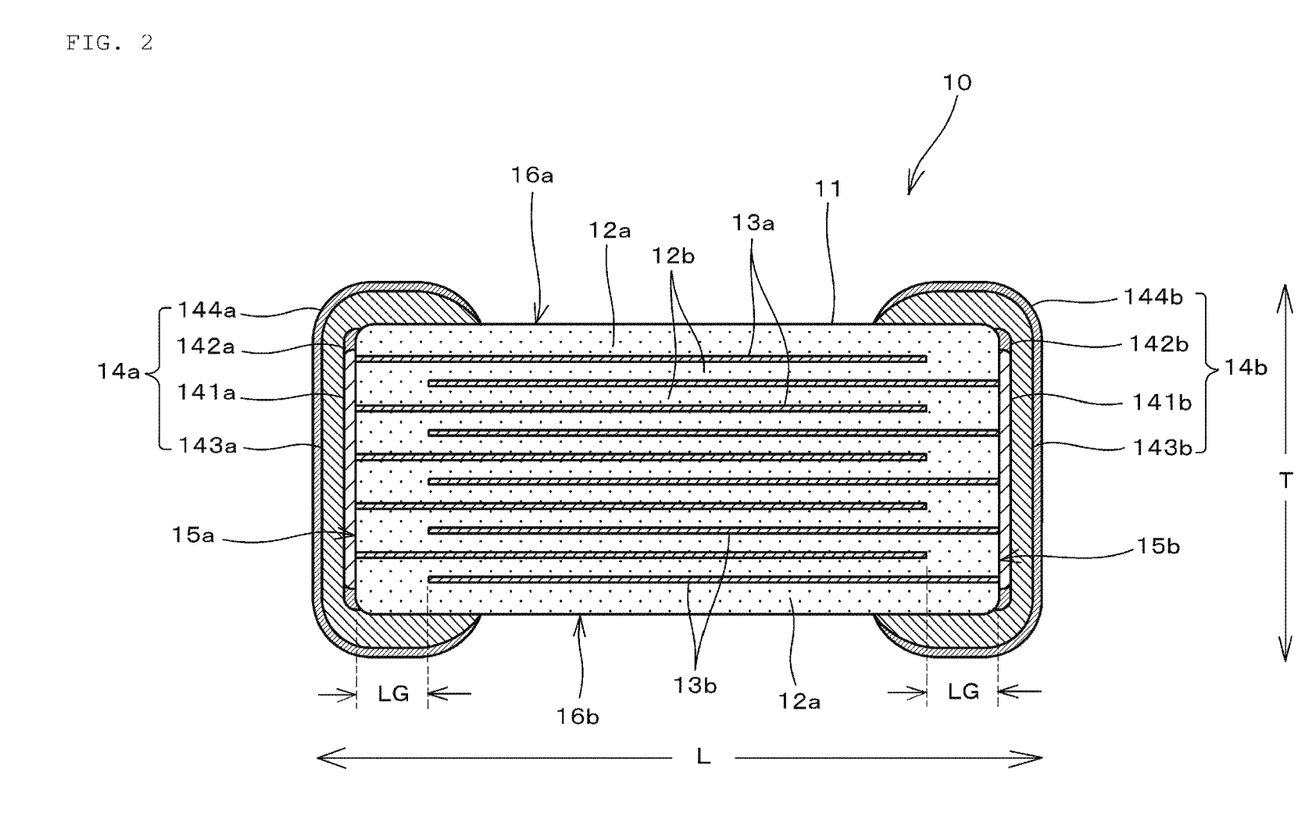
FIG. 2 is a sectional view of the multilayer ceramic capacitor illustrated in FIG. 1, taken along line II-II.
Figure 3:
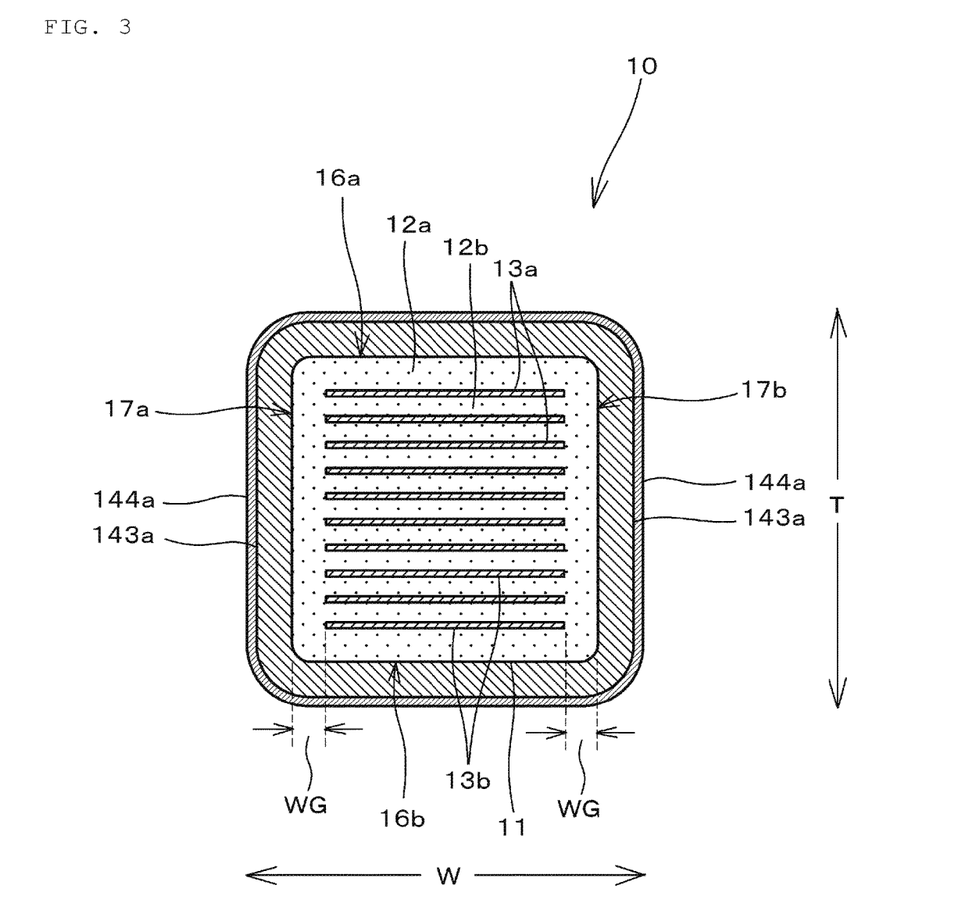
FIG. 3 is a sectional view of the multilayer ceramic capacitor illustrated in FIG. 1, taken along line III-III.
Figure 4:
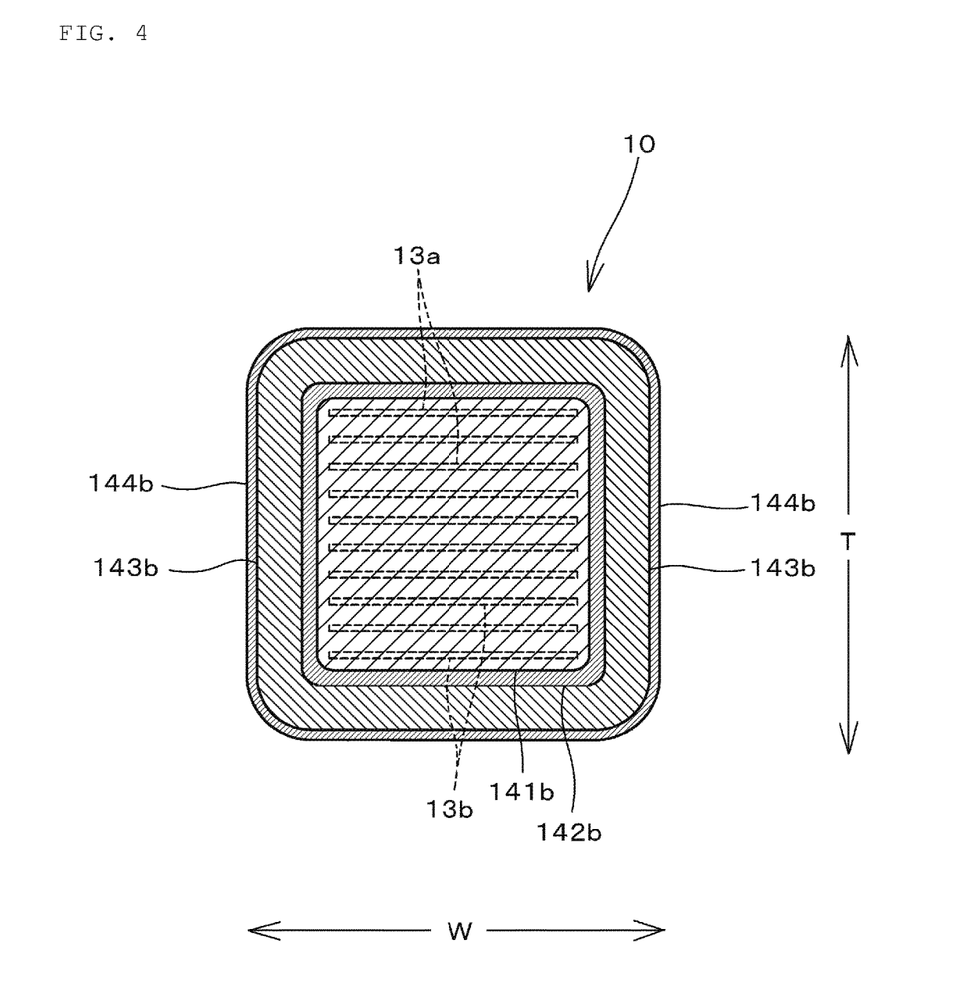
FIG. 4 is a sectional view of the multilayer ceramic capacitor illustrated in FIG. 1, taken along line IV-IV.

FIG. 1 is a perspective view of a multilayer ceramic capacitor 10 in a preferred embodiment of the present invention. FIG. 2 is a sectional view of the multilayer ceramic capacitor 10 illustrated in FIG. 1, taken along line II-II. FIG. 3 is a sectional view of the multilayer ceramic capacitor 10 illustrated in FIG. 1, taken along line III-III. FIG. 4 is a sectional view of the multilayer ceramic capacitor 10 illustrated in FIG. 1, taken along line IV-IV. FIG. 4 is a sectional view taken at a top surface of a metal layer 141b described below.

As illustrated in FIGS. 1 to 4, the multilayer ceramic capacitor 10 is an electronic component preferably having a rectangular or substantially rectangular parallelepiped shape, and includes a laminate 11, and a pair of external electrodes 14 (14a and 14b). The pair of external electrodes 14 (14a and 14b) is disposed so as to face a first end surface 15a and a second end surface 15b of the laminate 11, respectively, as described below.

As illustrated in FIGS. 2 and 3, the laminate 11 includes dielectric layers 12 (12a and 12b) that are alternately stacked with each other, first internal electrodes 13a extended to the first end surface 15a of the laminate 11, and second internal electrodes 13b extended to the second end surface 15b, as described below. That is, the plurality of dielectric layers 12, and the plurality of internal electrodes 13 (13a and 13b), are alternately stacked to form the laminate 11.

A direction in which the pair of external electrodes 14 face each other is denoted as a lengthwise direction of the multilayer ceramic capacitor 10, a lamination direction of the dielectric layers 12 and the internal electrodes 13 is denoted as a thickness direction, and a direction orthogonal or substantially orthogonal to each of the lengthwise direction and the thickness direction is denoted as a width direction.

The laminate 11 includes the first end surface 15a and the second end surface 15b, facing each other in the lengthwise direction, a first principal surface 16a and a second principal surface 16b, facing each other in the thickness direction, and a first side surface 17a and a second side surface 17b, facing each other in the width direction. The first end surface 15a is provided with the external electrode 14a, and the second end surface 15b is provided with the external electrode 14b.

It is preferable that the laminate 11 includes rounded corners and rounded ridge line portions. Each of the corners is a portion at which three surfaces of the laminate 11 intersect with each other, and each of the ridge line portions is a portion at which two surfaces of the laminate 11 intersect with each other.

It is preferable that the laminate 11 has a dimension not less than about 200 µm and not more than about 2000 µm in the lengthwise direction, a dimension not less than about 100 µm and not more than about 1000 µm in the width direction, and a dimension not less than about 100 µm and not more than about 1000 µm in thickness direction, for example. The dimensions of the laminate 11 may be measured with one of a micro meter and an optical microscope.

As illustrated in FIGS. 2 and 3, the dielectric layers 12 include outer dielectric layers 12a and inner dielectric layers 12b. The outer dielectric layers 12a are positioned on the corresponding one of a first principal surface 16a side and a second principal surface 16b side of the laminate 11, or are positioned on both sides of the laminate 11 in the thickness direction. That is, each of the outer dielectric layers 12a is positioned in the corresponding one of a portion between the first principal surface 16a and the first internal electrode 13a closest to the first principal surface 16a, and a portion between the second principal surface 16b and the second internal electrode 13b closest to the second principal surface 16b.

The inner dielectric layers 12b are positioned between the respective first internal electrodes 13a and the second internal electrodes 13b.

It is preferable that the number of dielectric layers 12 is not less than about 10 and not more than about 1000, for example. The number of dielectric layers 12 includes the number of outer dielectric layers 12a.

It is preferable that the inner dielectric layer 12b positioned between first internal electrode 13a and the second internal electrode 13b in the dielectric layers 12 has a thickness of not less than about 0.3 µm and not more than about 5.0 µm, for example. In addition, it is preferable that a thickness of the outer dielectric layer 12a is not less than about 10 µm and not more than about 100 µm, for example.

As described above, the laminate 11 includes the first internal electrodes 13a extended to the first end surface 15a, and the second internal electrodes 13b extended to the second end surface 15b. The first internal electrodes 13a and the second internal electrode 13b are alternately disposed in the thickness direction through the respective inner dielectric layers 12b.

The first internal electrode 13a includes a counter electrode portion facing the second internal electrode 13b, and an extended electrode portion provided by extending the first internal electrode 13a to the first end surface 15a of the laminate 11 from the counter electrode portion. The second internal electrode 13b includes a counter electrode portion facing the first internal electrode 13a, and an extended electrode portion provided by extending the second internal electrode 13b to the second end surface 15b of the laminate 11 from the counter electrode portion. When the counter electrode portion of the first internal electrode 13a is opposite to the counter electrode portion of the second internal electrode 13b through the inner dielectric layer 12b, capacitance is produced, so as to define capacitors.

The first internal electrode 13a and the second internal electrode 13b each preferably include metal such as Ni, Cu, Ag, Pd, and Au, an alloy of Ni and Cu, an alloy of Ag and Pd, and other suitable metals, for example.

The first internal electrode 13a and the second internal electrode 13b may include grains of a dielectric with the same or substantially the same composition base as that of the ceramic contained in the dielectric layer 11.

It is preferable that the number of internal electrodes 13 including the first internal electrodes 13a and the second internal electrodes 13b is not less than about 10 and not more than about 1000, for example.

In addition, it is preferable that a thickness of each of the first internal electrode 13a and the second internal electrode 13b is not less than about 0.3 µm and not more than about 5.0 µm, for example. In particular, the first internal electrode 13a and the second internal electrode 13b each with a thickness of about 0.5 µm or more enable a plated film to be easily plated when the metal layer described below is formed by plating.

It is preferable that coverage being a ratio of the internal electrode 13 to the dielectric layer 12 covered with the internal electrode 13 is about 30% or more, for example.

It is preferable that a dimension in the width direction of each of traverse gaps WG, which are regions from the corresponding ends of the first and second internal electrodes 13a and 13b in the width direction to the corresponding first and second side surfaces 17a and 17b of the laminate 11, is not less than about 5 μm and not more than about 30 μm, for example.

In addition, it is preferable that a dimension in the lengthwise direction of each of longitudinal gaps LG, which are regions from the corresponding leading ends of the first and second internal electrodes 13a and 13b on opposite sides to the extended electrode portions to the corresponding first and second end surfaces 15a and 15b of the laminate 11, is not less than about 5 μm and not more than about 30 μm, for example.

The external electrode 14a is not only provided on all of the first end surface 15a of the laminate 11, but also provided so as to extend to a first principal surface 16a, a second principal surface 16b, a first side surface 17a, and a second side surface 17b from the first end surface 15a. In addition, the external electrode 14b is not only provided on all of the second end surface 15b of the laminate 11, but also provided so as to extend to the first principal surface 16a, the second principal surface 16b, the first side surface 17a, and the second side surface 17b from the second end surface 15b.

The one external electrode 14a is electrically connected to the first internal electrode 13a, and the other external electrode 14b is electrically connected to the second internal electrode 13b.

The external electrode 14a includes a metal layer 141a, a glass film 142a, a baked layer 143a, and a plated film 144a. The external electrode 14b includes a metal layer 141b, a glass film 142b, a baked layer 143b, and a plated film 144b.

The metal layer 141a is disposed on the first end surface 15a so as to cover the first internal electrodes 13a extended to the first end surface 15a. The metal layer 141b is disposed on the second end surface 15b so as to cover the second internal electrodes 13b extended to the second end surface 15b.

A portion of metal defining the metal layer 141a spreads into the first internal electrode 13a. In addition, a portion of metal defining the first internal electrode 13a spreads into the metal layer 141a. When the metal of the metal layer 141a and the metal of the first internal electrode 13a spread to each other, a bonding level as well as a fixing strength between the metal layer 141a and the first internal electrode 13a are increased.

Similarly, a portion of metal defining the metal layer 141b spreads into the second internal electrode 13b. In addition, a portion of metal defining the second internal electrode 13b spreads into the metal layer 141b. When the metal of the metal layer 141b and the metal of the second internal electrode 13b spread to each other, a bonding level as well as a fixing strength between the metal layer 141b and the second internal electrode 13b are increased.

The metal layers 141a and 141b are each preferably made of a material including at least one metal selected from a group consisting of Cu, Ni, Ag, Pd, Au, and other suitable metals, for example. The metal layers 141a and 141b each may preferably include the at least one metal at a content of about 99% or more by weight, for example. In addition, the metal layers 141a and 141b each may preferably be an alloy of Cu and Ni, and an alloy of Ag and Pd, for example. However, each of the metal layers 141a and 141b includes no glass.

The metal layers 141a and 141b may each be formed by plating, for example. It can be confirmed that the metal layers 141a and 141b are each plating layers by checking that each of the metal layers 141a and 141b includes no glass, or by checking a crystal structure of each of the metal layers 141a and 141b.

It can be confirmed that each of the metal layers 141a and 141b includes no glass by checking whether or not Si is detected with a field emission wavelength-dispersive X-ray spectrometer (FE-WDX), for example.

A crystal structure of each of the metal layers 141a and 141b may be checked by analyzing an FIB-SIM image. That is, while channeling contrast may be checked in a metal portion, no channeling contrast is able to be checked in a glass portion due to its amorphous structure, and thus, the glass portion is seen in black.

It is preferable that a thickness of each of the metal layers 141a and 141b is not less than about 1 μm and not more than about 10 μm, for example.

This is because the uniformity of each of the metal layers 141a and 141b deteriorates to reduce the fixing strength when the metal layers 141a and 141b have a thickness of less than about 1 μm, and an internal stress in each of the metal layers 141a and 141b increases to reduce the fixing strength when the metal layers 141a and 141b each have a thickness of more than about 10 μm.

The baked layer 143a includes glass and metal, and is disposed so as to cover the metal layer 141a. The baked layer 143b includes glass and metal, and is disposed so as to cover the metal layer 141b.

The baked layers 143a and 143b are each formed by applying and baking a conductive paste including glass and metal. The baking may be simultaneously performed with firing of the laminate 11, or may be performed after firing of the laminate 11.

The baked layers 143a and 143b each preferably include metal that is at least one metal selected from a group consisting of Cu, Ni, Ag, Pd, Au, and other suitable metals, for example. The baked layers 143a and 143b may each be a single layer or multiple layers.

It is preferable that a thickness of each of the baked layers 143a and 143b, more specifically a thickness of the thickest portion thereof, is not less than about 3 μm and not more than about 30 μm, for example.

As illustrated in FIGS. 2 and 4, the glass film 142b is disposed around the metal layer 141b so as to surround the metal layer 141b while being adjacent thereto. When the glass film 142b is disposed so as to surround the metal layer 141b while being adjacent thereto, it is possible to prevent entry of moisture into a boundary surface between the dielectric layer 12 and the internal electrode 13 through the periphery of the metal layer 141b.

Similarly, the glass film 142a is disposed around the metal layer 141a so as to surround the metal layer 141a while being adjacent thereto. When the glass film 142a is disposed so as to surround the metal layer 141a while being adjacent thereto, it is possible to prevent entry of moisture into the boundary surface between the dielectric layer 12 and the internal electrode 13 through the periphery of the metal layer 141a.

The glass films 142a and 142b are each formed when glass included in a conductive paste for forming the baked layers 143a and 143b moves to the boundary surface of the dielectric layer 12 during a process of forming the baked layers 143a and 143b. The glass films 142a and 142b do not need to be made of only glass, and thus, may include another component, such as metal along with the glass, however, it is preferable to have a high glass content.

The glass film 142a preferably has a glass content higher than that of the baked layer 143a positioned on the metal layer 141a. Similarly, the glass film 142b preferably has a glass content higher than that of the baked layer 143b positioned on the metal layer 141b.

To ensure moisture resistance, it is preferable that, in a region in the first end surface 15a of the laminate 11, an area of a region where the glass film 142a is disposed is about 10% or more of an area of a peripheral portion except the metal layer 141a, for example. Similar, it is preferable that, in a region in the second end surface 15b of the laminate 11, an area of a region where the glass film 142b is disposed is about 10% or more of an area of a peripheral portion except the metal layer 141b, for example. That is, in the corresponding end surfaces 15a and 15b of the laminate 11, when an area of each of regions where the respective glass films 142a and 142b are disposed is less than about 10% of an area of each of peripheral portions except the respective metal layers 141a and 141b, moisture resistance may deteriorate.

It can be determined by the following method whether or not the glass film 142a is provided in the first end surface 15a of the laminate 11, and whether or not the glass film 142b is provided in the second end surface 15b thereof. First, the multilayer ceramic capacitor 10 is ground from the end surface 15a or 15b of the laminate 11 in its lengthwise direction, and grinding is stopped when the corresponding one of the metal layers 141a and 141b is exposed. In this state, the end surface portion is checked whether or not there is Si by using element mapping with a field emission wavelength-dispersive X-ray spectrometer (FE-WDX) to determine whether or not there is the corresponding one of the glass films 142a and 142b.

The plated film 144a is disposed so as to cover the baked layer 143a. The plated film 144b is disposed so as to cover the baked layer 143b.

The plated films 144a and 144b are each preferably made of a material including at least one of Cu, Ni, Ag, Pd, Au, and other suitable material, or a material such as an alloy of Ag and Pd, for example. The plated films 144a and 144b each include no glass. The plated films 144a and 144b may each be a single layer or multiple layers.

In the present preferred embodiment, each of the plated films 144a and 144b includes a lower plated film and an upper plated film provided on the lower plated film. The lower plated film preferably includes at least one of Cu, Ni, Ag, Pd, an alloy of Ag and Pd, and Au, for example, and the upper plated film is preferably an Sn-plated film, for example. When the upper plated film is an Sn-plated film, solder wettability when the multilayer ceramic capacitor 10 is mounted is improved to enable the multilayer ceramic capacitor 10 to be easily mounted. It is preferable that the upper plated film has a thickness of not less than about 1 μm and not more than about 10 μm, for example.

It is preferable that the multilayer ceramic capacitor 10 including the laminate 11 and the external electrode 14, described above, has a dimension L not less than about 0.2 mm and not more than about 2.0 mm in its lengthwise direction, a dimension W not less than about 0.1 mm and not more than about 1.2 mm in its width direction, and a dimension T not less than about 0.1 mm and not more than about 1.2 mm in its thickness direction.

In the multilayer ceramic capacitor 10 of the present preferred embodiment, the metal layer 141a is disposed so as to cover the first internal electrodes 13a extended to the first end surface 15a of the laminate 11, and further the baked layer 143a including glass and metal is disposed so as to cover the metal layer 141a.

In addition, the metal layer 141b is disposed so as to cover the second internal electrodes 13b extended to the second end surface 15b of the laminate 11, and further the baked layer 143b including glass and metal is disposed so as to cover the metal layer 141b. As a result, even when the external electrode 14 is reduced in thickness, entry of moisture into the laminate 11 through the end surfaces 15a and 15b of the laminate 11 is able to be reduced to enable moisture resistance reliability to be improved. In addition, the external electrode 14 is able to be reduced in thickness, so that the multilayer ceramic capacitor 10 with a small size and large capacitance is provided.

In particular, in the multilayer ceramic capacitor 10 of the present preferred embodiment, the glass film 142a is disposed around the metal layer 141a on the first end surface 15a of the laminate 11 while being adjacent to the metal layer 141a, and the glass film 142b is disposed around the metal layer 141b on the second end surface 15b of the laminate 11 while being adjacent to the metal layer 141b. This enables entry of moisture into the laminate 11 through the periphery of each of the metal layers 141a and 141b to be prevented.

Figure 5:
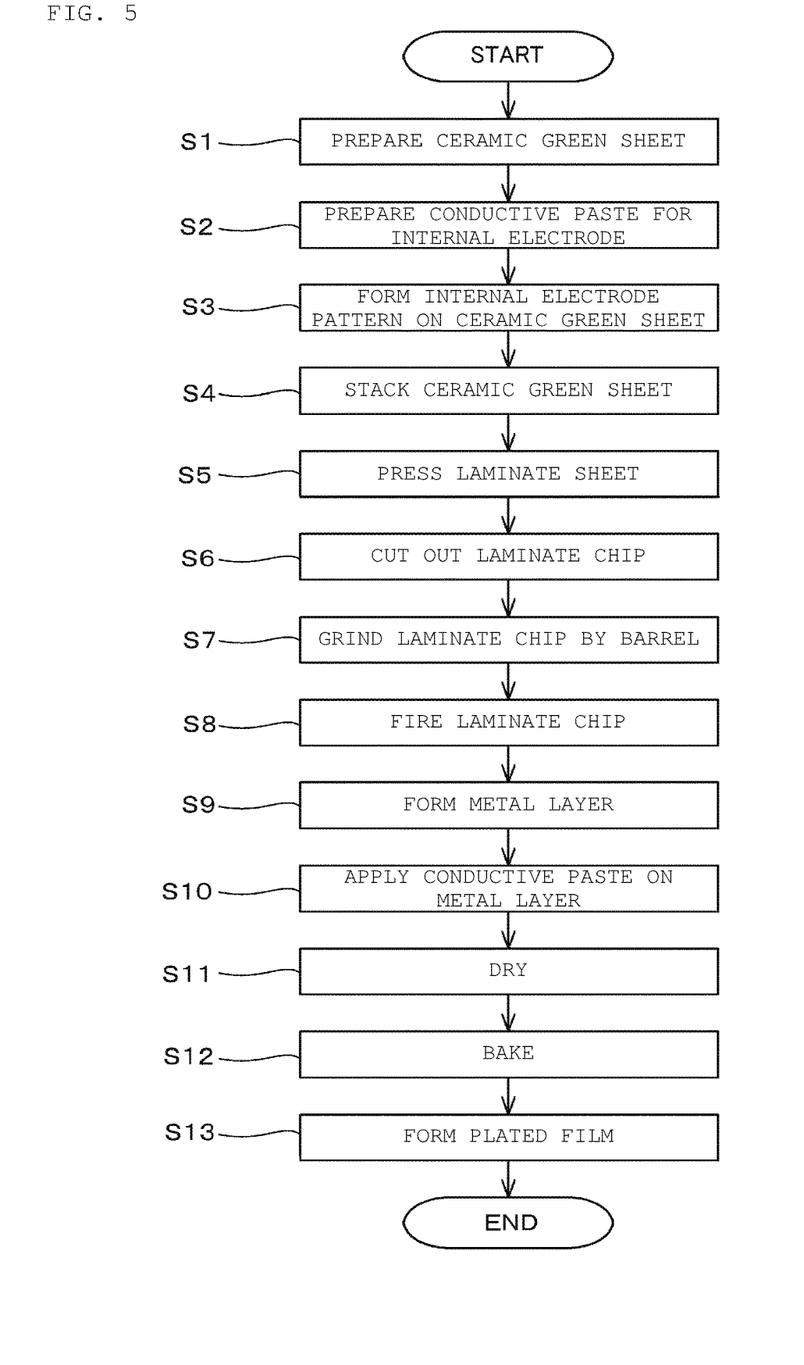
FIG. 5 is a flowchart to describe a method for manufacturing a multilayer ceramic capacitor according to a preferred embodiment of the present invention.

FIG. 5 is a flowchart to describe a non-limiting example of a method for manufacturing a multilayer ceramic capacitor 10 in a preferred embodiment of the present invention.

First, a ceramic green sheet for a dielectric layer and a conductive paste for an internal electrode are prepared (steps S1 and S2). While the ceramic green sheet and the conductive paste for an internal electrode include a binder and a solvent, a publicly known organic binder and organic solvent are available therefor.

Subsequently, an internal electrode pattern is formed on the ceramic green sheet by printing a predetermined pattern with the conductive paste for an internal electrode by screen printing or gravure printing, for example (step S3).

After that, a predetermined number of outer layer ceramic green sheets, on which no internal electrode pattern is formed, is stacked, and ceramic green sheets, on each of which an internal electrode pattern is printed, are sequentially stacked on the outer layer ceramic green sheets, and then a predetermined number of the outer layer ceramic green sheets is stacked on the ceramic green sheets to form a laminate sheet (step S4).

Subsequently, the formed laminate sheet is pressed in a lamination direction by an isostatic press or other suitable press to form a laminate block (step S5). Then, the laminate block is cut into a predetermined size, so that a laminate chip is cut out (step S6). After that, corners and ridge line portions of the laminate chip are rounded by barrel finishing or other suitable process (step S7).

Subsequently, the laminate chip is fired to acquire a fired laminate (step S8).

Through steps S1 to S8 described above, a laminate before an external electrode is formed is prepared.

Subsequently, a metal layer is formed on an end surface of the fired laminate (step S9). More specifically, the metal layer is formed on the end surface of the laminate so as to cover internal electrodes extended to the end surface of the laminate.

The metal layer is described here as a layer including about 99% or more Cu by weight. It can be confirmed whether or not about 99% or more Cu by weight is included by observing an end surface of a laminate with a wavelength dispersive X-ray spectroscope (WDX) to determine whether or not Cu within a field of view is detected at a purity of 99% by weight, for example.

The metal layer may be formed by plating, for example. When the metal layer is formed by plating, it is preferable to apply hydrophilic treatment to a laminate before plating so that the laminate has an affinity for plating liquid.

Any one of electrolytic plating and electroless plating may be used for the plating. However, electroless plating requires pretreatment, such as catalyst addition, to increase a plating deposition rate, which causes the process to be complicated. Thus, it is preferable to use electrolytic plating. In addition, it is preferable to use barrel plating as a plating method.

In particular, when a dielectric layer is about 1 μm or less in thickness, a plated film is further plated from a starting point of an internal electrode exposed to an end surface of a laminate. As a result, the plated film tends to be easily plated to improve uniformity.

The metal layer may be formed by pasting a conductive sheet, including Cu and a binder, on an end surface of a laminate. When the metal layer is formed by pasting a conductive sheet, the conductive sheet also may be pasted before the barrel finishing described above. The laminate has sharp corners and ridge line portions before the barrel finishing, so that the conductive sheet is able to be easily punched out and pasted to the laminate.

The metal layer also may be formed by printing an end surface of a laminate with a conductive paste including Cu by screen printing. The end surface of the laminate is directly printed with the conductive paste at the time of the screen printing, so that positioning between an internal electrode exposed to the end surface and the metal layer is facilitated. In addition, a surplus of the conductive paste is able to be easily recovered after the screen printing, so that a utilization ratio of the conductive paste is improved to provide a reduction in cost. As the conductive paste, a conductive paste which does not include a glass component is preferably used.

Subsequently, a conductive paste for a baked layer is applied so as to cover the metal layer (step S10). The conductive paste for a baked layer includes metal grains including Cu, and Si—B—Ba-based glass.

Figure 6:
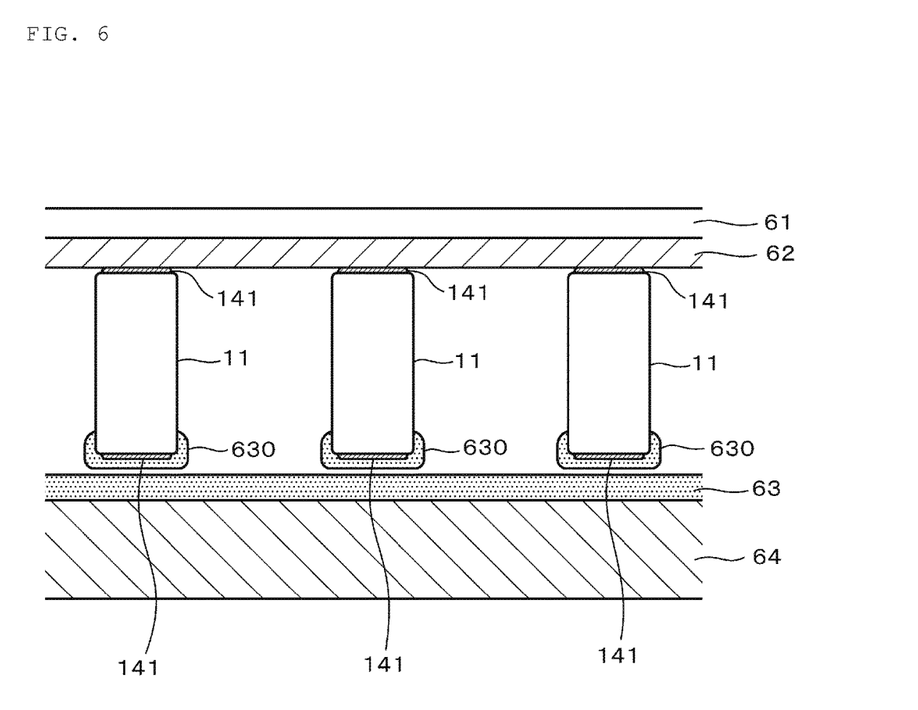
FIG. 6 is a view illustrating a method for applying a conductive paste for a baked layer on a metal layer.

A detailed example of a method for applying the conductive paste for a baked layer so as to cover the metal layer will be described with reference to FIG. 6. First, one of end surfaces of the laminate 11, on which the corresponding metal layers 141 (141a and 141b) are formed, is adhered to a holding plate 61 with an adhesive 62. When the conductive paste for a baked layer is simultaneously applied to a plurality of laminates 11, one end surface of each of the plurality of laminates 11 may preferably be adhered to the holding plate 61 with the adhesive 62, as illustrated in FIG. 6.

Subsequently, the holding plate 61 to which the laminate 11 adheres is brought close to a base plate 64 provided on its surface with a paste layer 63 made of the conductive paste, and then the other end surface of the laminate 11 is dipped into the paste layer 63. FIG. 6 illustrates a state where a conductive paste 630 in the paste layer 63 is applied to the end surface of the laminate 11, opposite to the holding plate 61.

After the conductive paste is applied, a surplus of the conductive paste may be wiped away. In addition, it is preferable to apply an oil repellent treatment to a region where the application of the conductive paste is undesirable to prevent excess spread of the conductive paste to a side surface of the laminate 11.

After the conductive paste applied to the end surface of the laminate 11 is dried, the conductive paste is applied to the other end surface of the laminate 11, to which the conductive paste is not applied, by the same or similar method as described above.

Then, after the conductive paste applied to the other end surface of the laminate 11 is dried (step S11), the laminate 11 is baked at a temperature of not less than about 700° C. and not more than about 900° C. (step S12), for example. This enables the baked layers 143a and 143b illustrated in FIGS. 2 to 4 to be formed. Then, glass included in the conductive paste for a baked layer moves toward a ceramic boundary surface to form the glass films 142a and 142b illustrated in FIG. 2.

At this time, it is preferable to bake the laminate 11 in an oxidation atmosphere. The glass included in the conductive paste for a baked layer tends to be attracted to a dielectric ceramic being an oxide, so that the glass tends to be easily deposited on the dielectric ceramic around the metal layer so as to be adjacent to the metal layer when the laminate 11 is baked in an oxidation atmosphere.

After that, a plated film is formed on the baked layer (step S13). To form the plated film, Ni plating is applied so as to cover the baked layer, for example, and then Sn plating is applied on the Ni plating. It is preferable that a thickness of the plated film is not less than about 1 μm and not more than about 7 μm, for example.

To perform a moisture resistance test, a multilayer ceramic capacitor 10 having a dimension L of about 0.6 mm in its lengthwise direction, a dimension W of about 0.3 mm in its width direction, a dimension T of about 0.3 mm in its thickness direction, and a capacitance of about 2.2 μF were prepared.

The multilayer ceramic capacitor 10 included inner dielectric layers 12b each having a thickness of about 0.65 μm, and internal electrodes 13 each having a thickness of about 0.43 μm, the number of internal electrodes 13 being 280, for example. In addition, the metal layers 141a and 141b each had a thickness of about 5 μm, and included Cu at a ratio of about 99% or more by weight, for example.

To perform the moisture resistance test, four types of multilayer ceramic capacitors manufactured by using different respective conductive pastes for a baked layer were prepared as shown in Table 1. In Table 1, a multilayer ceramic capacitor of a sample number 1 with a mark * is a sample of a comparative example in which a conductive paste for a baked layer includes no glass, and does not satisfy the requirements of the present invention. The sample of the comparative example included a conductive paste for a baked layer, including no glass, so that a multilayer ceramic capacitor manufactured was not provided with glass films 142a and 142b such as illustrated in FIG. 2.

Meanwhile, in Table 1, multilayer ceramic capacitors of sample numbers 2 to 4 without the mark * are samples that respectively have ratios of about 5% by volume, about 15% by volume, and about 25% by volume of glass included in respective conductive pastes for a baked layer, and satisfy the requirements of the present invention. Each of the multilayer ceramic capacitors of the sample numbers 2 to 4 was provided with glass films 142a and 142b as illustrated in FIG. 2.

TABLE 1

| Sample number | *1 | 2 | 3 | 4 |
|---|---|---|---|---|
| Ratio of glass in conductive paste for baked layer | None | 5% by volume | 15% by volume | 25% by volume |
| Existence of glass film around metal layer | None | Exist | Exist | Exist |
| Moisture resistance reliability test (ten samples) Number of occurrences of IR deterioration | Three samples | None | None | None |
| Determination | × | ○ | ○ | ○ |

A conductive paste for a baked layer used for manufacturing each of the multilayer ceramic capacitors of the sample number 2 to 4 included Cu grains each having a grain diameter of about 3 μm, and Si—B—Ba-based glass grains each having a grain diameter of about 2 μm, for example.

The moisture resistance reliability test was performed in an environment of about 125° C. and about 95% RH by applying a voltage of about 3.2 V to each sample for about 72 hours, for example. Then, a sample with a logarithmic value decreasing by two-digit or more from a logarithmic value (log IR) of insulation resistance (IR) immediately after the evaluation test starts was determined as an IR deterioration. Ten samples were prepared for each of sample numbers 1 to 4 to perform the moisture resistance reliability test, and then the number of occurrences of the IR deterioration was checked.

As shown in Table 1, no IR deterioration occurred in the multilayer ceramic capacitors of the sample numbers 2 to 4, satisfying the requirements of the present invention. That is, according to the moisture resistance test, when a ratio of glass included in each of the conductive pastes for a baked layer, used for manufacturing the multilayer ceramic capacitors, was about 5% by volume or more, the IR deterioration did not occur.

Meanwhile, in the multilayer ceramic capacitors (samples of the sample number 1) of the comparative example in which the conductive paste for a baked layer included no glass, and glass films 142a and 142b such as illustrated in FIG. 2 were not formed, an IR deterioration occurred in three samples of ten samples. It is thought that the IR deterioration was caused by entry of moisture into the laminate through an end surface thereof.

That is, the multilayer ceramic capacitor 10 of the present preferred embodiment, in which the metal layers 141a and 141b are disposed so as to cover the internal electrodes 13 extended to the end surfaces 15a and 15b of the laminate, respectively, and the baked layers 143a and 143b each including glass and metal are disposed so as to cover the metal layers 141a and 141b, respectively, enables moisture resistance reliability to be improved by reducing entry of moisture into the laminate 11 through the end surfaces 15a and 15b of the laminate 11.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a laminate including a plurality of dielectric layers and a plurality of internal electrodes that are alternately stacked with each other; and
   a pair of external electrodes each of which is provided on a surface of the laminate to be electrically connected to the plurality of internal electrodes extended to the surface of the laminate; wherein
   the laminate includes:
      a first principal surface and a second principal surface, facing each other in a thickness direction being a stacked direction of the plurality of dielectric layers and the plurality of internal electrodes;
      a first end surface and a second end surface, facing each other in a lengthwise direction being a direction in which the pair of external electrodes face each other, and being provided with the corresponding external electrodes; and
      a first side surface and a second side surface, facing each other in a width direction orthogonal or substantially orthogonal to the thickness direction and the lengthwise direction;
   each of the external electrodes includes:
      a metal layer disposed on a corresponding one of the first end surface and the second end surface so as to cover corresponding internal electrodes extended to the first end surface and to the second end surface;
      a baked layer including glass and metal, and being disposed so as to cover the metal layer; and
      a plated film disposed so as to cover the baked layer;
   the metal layer is separate and distinct from the baked layer;
   the multilayer ceramic capacitor further includes a glass film disposed around the metal layer while being adjacent to the metal layer on each of the first end surface and the second end surface; and
   the baked layer is in direct contact with at least a portion of the metal layer.

2. The multilayer ceramic capacitor according to claim 1, wherein the metal layer includes at least one metal selected from a group consisting of Cu, Ni, Ag, Pd, and Au.

3. The multilayer ceramic capacitor according to claim 1, wherein the glass film has a glass content higher than that of the baked layer disposed on the metal layer.

4. The multilayer ceramic capacitor according to claim 1, wherein the laminate includes rounded corners and rounded ridge line portions.

5. The multilayer ceramic capacitor according to claim 1, wherein the laminate has a dimension not less than about 200 μm and not more than about 2000 μm in the lengthwise direction, a dimension not less than about 100 μm and not more than about 1000 μm in the width direction, and a dimension not less than about 100 μm and not more than about 1000 μm in the thickness direction.

6. The multilayer ceramic capacitor according to claim 1, wherein a number of the plurality of dielectric layers is not less than about 10 and not more than about 1000.

7. The multilayer ceramic capacitor according to claim 1, wherein a thickness of each of the plurality of internal electrodes is not less than about 0.3 μm and not more than about 5.0 μm.

8. The multilayer ceramic capacitor according to claim 1, wherein a thickness of each of the metal layers is not less than about 1 μm and not more than about 10 μm.

9. The multilayer ceramic capacitor according to claim 1, wherein each of the plated films includes a lower plated film and an upper plated film provided on the lower plated film.

10. The multilayer ceramic capacitor according to claim 9, wherein
    the lower plated film includes at least one of Cu, Ni, Ag, Pd, an alloy of Ag and Pd, and Au; and
    the upper plated film is an Sn-plated film.

* * * * *